United States Patent

[11] 3,570,417

| [72] | Inventors | Fred Herrmann<br>Clarks Summit;<br>Alexander Tomczyk, Laflin; Harvey Sdorow, Kingston, Pa. |
|---|---|---|
| [21] | Appl. No. | 843,304 |
| [22] | Filed | July 22, 1969 |
| [45] | Patented | Mar. 16, 1971 |
| [73] | Assignee | Topps Chewing Gum, Incorporated<br>Brooklyn, N.Y. |

[54] METHOD OF MAKING DECORATIVE CONFECTIONERY PRODUCT
4 Claims, 3 Drawing Figs.

[52] U.S. Cl. .................................................. 107/54, 107/14
[51] Int. Cl. .................................................. A23p 1/00
[50] Field of Search .......................................... 107/4 (F), 54, 54 (F), 54 (H), 14 (A)—14 (C), 68

[56] References Cited
UNITED STATES PATENTS

| 1,206,069 | 11/1916 | Werner ......................... | 107/68 |
| 2,094,289 | 9/1937 | Blum et al .................... | 107/68 |
| 2,931,321 | 4/1960 | Bestoso ....................... | 107/54F |

*Primary Examiner*—John E. Murtagh
*Attorneys*—Mark T. Basseches and Paula T. Basseches ABSTRACT: The method of making a multicolored confectionery product which includes the steps of extruding or otherwise forming an elongated length of a deformable plastic confection matrix material to provide a corrugated, three-dimensional surface, severing the length at spaced positions to define a series of increments, the formerly attached surfaces of the increments being substantially free of corrugations, and thereafter subjecting the several increments to a surface coloring step whereby the end or severed portions and the outer extremities of the corrugated portions are colored and the land areas between the corrugations are maintained essentially free of color, thus to define a multicolored confectionery item.

Patented March 16, 1971 3,570,417

INVENTORS
FRED HERRMANN
ALEXANDER TOMCZYK
HARVEY SDOROW
BY Mark Barreches
ATTORNEY

3,570,417

METHOD OF MAKING DECORATIVE CONFECTIONERY PRODUCT

BACKGROUND OF THE INVENTION

1. Field of the Invention

This invention is in the field of confectionery items, and more particularly in the field of candy or chewing gum which, at least in the manufacturing stages, is of a plastic or yieldable consistency.

2. The Prior Art

It is known to manufacture three-dimensional items, such as gum balls. Attempts have consistently been made to make such products more attractive to the consumer.

In accordance with such desideratum, various types and colors of coatings have been applied to gum balls and like products.

It is further known to coat a gum ball, for instance, with an edible sugar coating of a first color and thereafter apply a second and further coatings of different colors so that when the confection is consumed, the product will progressively assume a plurality of different colors as successive layers are exposed.

SUMMARY OF THE INVENTION

The present invention relates to a highly attractive confectionery product, and particularly to the method of making the same. The product which, in the illustrated embodiment comprises a chewing or bubble gum ball, exhibits a multicolored appearance.

The method of manufacturing the product comprises first forming an elongated length or increment of gum matrix, preferably by extrusion through a nozzle having a fluted orifice so as to define, in the elongated rope or length, a corrugated exterior surface. Thereafter the rope is severed into separate increments by severing, or severing and forming mechanism shifted normally or angularly relative to the longitudinal axis of the rope so as to define increments, lengths or discrete portions which are characterized by a corrugated equator portion, the pole portions being essentially free from the corrugations of the original rope. [In the context of the present application, the severed ends of the increments are defined as the pole portions, and the circumference portion essentially midway of the poles as the equator.]

The thus formed increments are subjected to a surface coating step wherein the increments are panned or otherwise surface exposed to a liquid coating layer, the depth of which layer is such as to color or adhere to the peripheral portions, namely the poles and the outermost peripheral portions of the corrugated equator areas, the depth of the coating layer being insufficient to penetrate to the valleys or lands between the corrugations.

Where the matrix material is made of a color which contrasts with the coating material, the dried coated articles will exhibit an attractive, multicolored appearance.

It is accordingly an object of the invention to provide a method of manufacturing an attractive confectionery article.

Still a further object of the invention is the provision of a method of manufacturing an attractive confectionery article, such as a gum ball, having three-dimensional and multicolored effects.

To attain these objects and such further objects as may appear herein or be hereinafter pointed out, reference is made to the accompanying drawings, forming a part hereof, in which.

Figures 1, 2, 3:
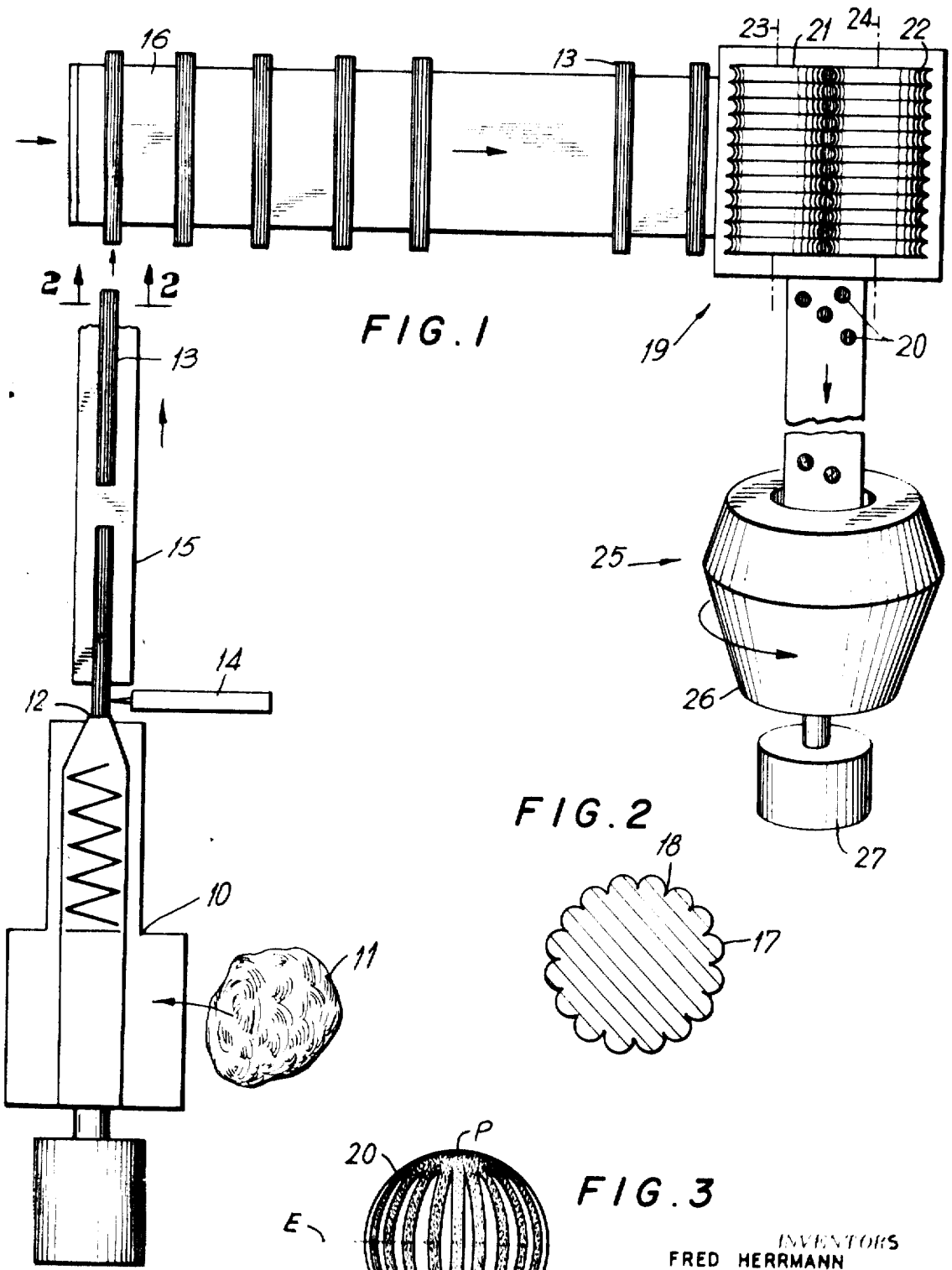
FIG. 1 is a diagrammatic plan view disclosing the various steps in the manufacture of the apparatus.
FIG. 2 is a magnified section taken on the line 2—2 of FIG. 1.
FIG. 3 is a perspective view of the finished product produced by the method of the present invention.

Referring now to the drawings, it will be appreciated that there is shown in FIG. 1 a series of processing steps, the apparatuses for practicing said steps being diagrammatically or schematically illustrated. Details of construction of the various apparatuses are well known in the art and, hence, an elaboration beyond the schematic showings is not required.

In accordance with the invention, 10 is a power-driven extruder which may be charged with a plastic material, such as a gum loaf 11. The gum is extruded through the nozzle 12 of the extruder in the form of ropelike lengths 13, individual lengths being severed from the continuous, extruded stream by a reciprocating cutter 14.

The lengths 13 are carried by a conveyor 15 in a direction aligned with the axis of the lengths and deposited on a second conveyor 16 advancing in a direction substantially normal to or transverse to the direction of movement of the first conveyor 15.

As best seen in FIG. 2, the extrusion nozzle 12 is configurated to define, on the outer surface of the ropes, a fluted or corrugated peripheral portion including raised or outwardly directed beads or ribs 17, separated by lands or valleys 18.

The lengths 13 are advanced by the conveyor 16 into a ball forming apparatus 19 of known type which, by a combined severing and rolling step, separates the ropes or lengths 13 into balls or increments 20 of the shape illustrated in FIG. 3.

It will be understood from an inspection of FIG. 3 that the combined rolling and severing action of the ball former 19, which includes a multiplicity of counterrotating discs 21, 22 which rotate about axes 23, 24, contours the material of the rope in the area of the poles P of the balls 20 so as essentially progressively to eliminate the corrugations in the area of the poles P while permitting the corrugations to remain to essentially their full depth in the plane of the equator E of the products 20.

It will further be observed that the depth of the corrugations is greatest at the equator, the corrugations, while retaining their identity, becoming progressively less deep and merging with the land areas as they approach the poles P.

The shaping of the balls, as is known, is effected by shifting the lengths 13 transversely as respects their longitudinal axes through the mating, opposed edge portions of the discs 21, 22, the peripheral portions of the discs, as clearly shown in FIG. 1, being concave and defining half rounds or semicircles. It will thus be observed that the juxtaposed peripheral edge portions of the sets of discs meet at a tangent portion which is essentially circular in section, the inner diameter of said circular section approximating the overall diameter of the rope.

The balls 20 emerging from the forming apparatus 19 are deposited in appropriate sized batches in a coating and tumbling tumbling apparatus 25. The apparatus 25 is again conventional but, in accordance with the method of the present invention, is operated in an unconventional manner.

Specifically, the apparatus 25 includes a tumbling drum 26 driven at a slow speed by motor 27, the hopper or interior surfaces at the lower portion of the drum being supplied with a thin layer or coating of material to be applied to the balls.

It is essential to the proper operation of the method that the depth or thickness of the coating in the hopper be limited to a value which is less than the depth of the corrugations from the base of the lands 18 to the outer periphery of the beads or ribs 17. Likewise, where large batches are simultaneously coated, the quantity and consistency of the coating material is controlled so that significant running or migration of the coating after application is resisted. Thus, the coating procedure may aptly be referred to as a surface coating, although, of course, depending upon the thickness of coating material, a layer will be deposited on areas slightly inwardly displaced from the periphery of the articles.

It will be readily appreciated that in lieu of the rotating hopper-type coating apparatus, a conventional panning apparatus may be employed, the pan, in such instance, being provided with a layer or thickness of material which is less than the depth between the periphery of the ribs and the base or innermost portion of the lands.

It will be appreciated that, as a result of the foregoing procedures, substantially the entirety of the article adjacent the pole areas will have been coated by the coating step whereas only the peripheral areas of the articles adjacent the equator will have been coated. Thus, assuming for instance that the gum matrix is pink in color and that a white coating is applied in the coating step, the poles and pole adjacent areas of the article will exhibit an essentially unbroken white appearance, as will the gradually broadening periphery of the ribs or corrugations at areas approaching the equator. However, the lands which grow progressively wider toward the equator, will maintain the original pink base color since the corrugations or ribs have maintained the lands out of contact with the surface coating material. Thus, a multicolored confectionery product will result.

Numerous variations within the spirit of the invention may be advantageously practiced. For instance, it is not required that the end products fabricated of the extruded, corrugated exterior lengths be spherical. It is conceivable, for instance, that the forming and separating apparatus may result in the production of pillow-shaped increments, which increments will maintain their corrugated configuration in the equator areas and form essentially smooth or noncorrugated areas at and adjacent the poles.

In similar fashion, the articles emerging from the forming step may be coated over their entire surfaces, i.e. at the lands and at the periphery of the ribs, by a conventional dip coating step. The coating may thereupon be dried and the articles thereafter subjected to a shallow coating step, resulting in the production of articles having the contrasting colors used in the two coating steps.

While the coloring procedures are referred to as "coating steps", it will be appreciated that in lieu of coating, a dyeing or like coloring process may be employed to impart the attractive, differentially colored appearance to the articles.

As a result of the practice of the method of the present invention, a highly attractive and unusual confectionery item is provided, using manufacturing procedures well suited to mass production techniques.

The practice employs confection forming and coloring apparatuses which are essentially conventional, the manner of operation of which will be known to those skilled in the art.

We claim:

1. The method of making multicolor, three-dimensional candy or chewing gum articles which comprises the steps of forming by extrusion a length of readily deformed chewing gum matrix, the periphery of said length being formed with a plurality of longitudinally directed corrugations, severing said length into a plurality of increments by the application of separating forces directed normal to the longitudinal axis of said length, thereby to define severed increments essentially free from said corrugations along the end portions defined by the severance areas, and thereafter subjecting said severed increments to a surface coloring step whereby said end portions and the outer extremities of said corrugations are colored and the land areas between said corrugations are maintained essentially free of color.

2. The method of making multicolored, three-dimensional candy or chewing gum items which comprises the steps of forming a length of readily deformable plastic confection matrix, the periphery of said length including a series of lengthwisely extending grooves, dividing said length into a series of increments through the use of separating and forming forces applied in a direction normal to the longitudinal axis of said length, said forces additionally flattening said grooves in the pole areas adjacent the areas of separation without affecting said grooves in the equator areas intermediate said poles, and thereafter subjecting said severed increments to a surface coloring step whereby said pole portions and the outermost extremities of said equator portions are coated and the land portions forming the base of said grooves are maintained essentially free of coating.

3. The method in accordance with claim 2 wherein said coloring step includes causing said increments to be moved relative to a vessel having a surface coating of said colorant.

4. The method of forming a multicolored, three-dimensional confectionery product, such as a chewing gum portion, which comprises the steps of forming a length of plastic confectionery matrix, said length including depressed portions extending along the length thereof, subjecting said length to forces applied normal to the longitudinal axis thereof, thereby to divide said length into a series of separate servings, said portions, in adjacent severance areas, being essentially smooth and form the pole portions, the equator portions between said severance areas maintaining said depressed portions, thereafter subjecting said separate increments to a surface coloring step whereby said pole portions and the periphery of said equator portions accept said color and the areas of depression are maintained essentially free from said colorant, thereby to form a multicolored end product.